United States Patent [19]

Barresi

[11] Patent Number: 5,213,289

[45] Date of Patent: May 25, 1993

[54] FRAMED AIRFOIL KITE

[76] Inventor: David P. Barresi, 15 Nutter Rd., N. Reading, Mass. 01864

[21] Appl. No.: 894,916

[22] Filed: Jun. 8, 1992

[51] Int. Cl.$^5$ .................. B64D 17/02; B64D 17/34; A63H 33/20

[52] U.S. Cl. .................. 244/145; 244/152; 244/153 R; 244/155 R

[58] Field of Search .............. 244/902, 153 R, 155 A, 244/145, 152

[56] References Cited

U.S. PATENT DOCUMENTS

| | | | |
|---|---|---|---|
| 4,209,148 | 6/1980 | Lemoigne | 244/152 |
| 4,363,458 | 11/1982 | Jones et al. | 244/153 R |
| 4,846,424 | 7/1989 | Prouty | 244/145 |
| 4,892,272 | 1/1990 | Hadzicki | 244/153 |
| 5,120,006 | 6/1992 | Hadzicki | 244/153 R |

*Primary Examiner*—Joseph F. Peters, Jr.
*Assistant Examiner*—Virna Lissi Ansley
*Attorney, Agent, or Firm*—Frederick R. Cantor

[57] ABSTRACT

An inflatable airfoil-shaped kite, which is framed by a front spar extending along the leading edge of the airfoil envelope, a rear spar extending along the envelope trailing edge, and two side spars extending along the side edges of the envelope. Upper and lower control lines are attached to end portions of the front and rear spars. Two control handles are attached to the opposite ends of the control lines, such that a person can manipulate the handles to move the kite through different maneuvers, e.g., reverse flight, power turning or pinwheeling. Each spar has end portions that can flex to generate localized drag forces which cause the kite to execute different maneuvers, as dictated by signals transmitted from the control handles through the control lines to end areas of the individual front, rear, and side spars.

12 Claims, 5 Drawing Sheets

FRAMED AIRFOIL KITE

BACKGROUND OF THE INVENTION

The present invention relates to airfoil kites.

The present invention more particularly relates to flexible fabric kites, that are inflatable by ram air to assume an airfoil shape.

The present invention further relates to a framed airfoil kite, that can perform all of the standard flying maneuvers of a prior art two control line, i.e., dual line, air ram flying structure, coupled with all of the standard flying maneuvers of a prior art four control line, i.e., quad line, flying device, as well as, a variety of intermediate maneuvers that neither prior art kite device can perform at the present time.

The present invention additionally relates to a framed airfoil kite, which can be readily manufactured at reasonable costs from available materials.

The present invention also relates to a framed airfoil kite, having control handles that are strong, comfortable, and so shaped, as to incorporate a sliding pivot point, that is accomplished by slightly modifying hand pressure from a finger grip position, to a hand grip position, that will produce a similar sliding pivot point response that allows the airfoil kite to have, e.g., a turning radius, limited only by its wing span.

The present invention still further relates to a framed airfoil kite, that is quick and easy to assemble and disassemble, and is extremely compact, compared to any prior art framed airfoil kite flying device of comparable size.

The present invention can be made to execute various maneuvers, e.g., turning, climbing or diving, uniquely, by means of control lines attached to framed end areas of the kite.

U.S. Pat. No. 4,363,458, to Jones, et al., shows a flexible fabric kite structure that can be inflated during flight to an airfoil configuration. An elongated, slot-like opening, in the leading edge of the kite structure, permits ram air to enter into the kite envelope to inflate it to an airfoil-shaped configuration. In order to rigidify the kite along its leading edge, the inflatable kite structure has a flexible spar running along its full width, i.e., span dimension.

The spar provides transverse rigidity that assists the kite in maintaining the airfoil configuration along a substantial percentage of the kite leading edge. Control lines are attached to opposite ends of the spar for suspending the kite in the windy atmosphere. The trailing edge of the kite is non-supported, and subject to the wind forces.

U.S. Pat. No. 4,892,272, to Hadzicki, discloses a fabric kite having a single flexible spar running along its leading edge. The kite has two V-shaped sail sections that rail the spar. Each V-shaped section is separately controlled by two control lines connected, respectively, to the spar and to the trailing edge of the V-shaped sail section. The Hadzicki kite has four control lines arranged in pairs. Each pair of control lines is attached to a separate control handle that is held in one hand of the person flying the kite. One control handle can be manipulated by the person's left hand, while the other control handle can be manipulated by the person's right hand.

In each of the above-noted patented structures, the kite is provided with a single flexible spar running along the leading edge of the kite structure. These prior art structures, clearly do not possess the unique features of the present invention, which will be described in greater detail herein.

SUMMARY OF THE INVENTION

An object of the present invention is to provide an airfoil kite.

Another object of the present invention is to provide a flexible fabric kite, that is inflatable by ram air to assume an airfoil shape.

Yet another object of the present invention is to provide a framed airfoil kite, that can perform all of the standard flying maneuvers of a prior art two control line, i.e., dual line, air ram flying structure, coupled with all of the standard flying maneuvers of a prior art four control line, i.e., quad line, flying device, as well as, a variety of intermediate maneuvers that neither prior art kite device can perform at the present time.

Still yet another object of the present invention is to provide a framed airfoil kite, which can be readily manufactured at reasonable costs from available materials.

A further object of the present invention is to provide a framed airfoil kite, having control handles that are strong, comfortable, and so shaped, as to incorporate a sliding pivot point, that is accomplished by slightly modifying hand pressure from a finger grip position, to a hand grip position, that will produce a similar sliding pivot point response that allows the airfoil kite to have, e.g., a turning radius, limited only by its wing span.

An additional object of the present invention is to provide a framed airfoil kite, that is quick and easy to assemble and disassemble, and is extremely compact, compared to any prior art framed airfoil kite flying device of comparable size.

The remaining object of the present invention is to provide an inflatable fabric kite structure having an airfoil cross-sectional shape when in the inflated condition. The kite structure is framed along its four edges by four separate spars, i.e., a front spar, extending along the kite leading edge, a rear spar, extending along the kite trailing edge, and two side spars, extending along the kite side edges.

Four separate control lines are connected to opposite ends of the front and rear spars. End areas of the front and rear spars are relatively flexible, such that the spars can bow upwardly in response to wind pressure on the kite undersurface. The central area of each front or rear spar is deflected upwardly, while the side edge areas of the kite structure extend downwardly, to form control surfaces for stabilizing the kite motion in a windy atmosphere.

Preferably, the central portion of each front, or rear spar, is relatively inflexible, such that flexing occurs primarily at, or near, the opposite ends of the respective spar. The central portions of the kite structure are thus maintained in an airfoil cross-sectional configuration, for achievement of a satisfactory lift action, in the presence of relatively slow wind speeds.

Each side spar extends along substantially the entire side edge of the fabric kite structure. Further, each side spar has a relatively inflexible front portion, and a relatively flexible rear portion. The front portion of each side spar is tied to the extreme tip end of the front spar by means of the fabric material of the kite structure. The rear portion of each side spar is tied directly to a tip end of the rear spar, such that, when a pulling force is applied to a control line attached to the rear spar, the associated side spar is also flexed along with the rear spar.

The four spars completely frame the fabric kite structure to form control surfaces that can be flexed in order to maneuver the kite through various turns and other motions. A person flying the kite can exert selective pull actions on the aforementioned control handles, whereby the attached control lines produce localized flexures of the spars, as necessary to put the kite through specific flight maneuvers.

An advantageous feature of the present invention is that the framed airfoil kite has a quick response to the control signals delivered to the kite through the control lines via manipulation of the control handles. Another advantage is that the airfoil kite can be maneuvered in both light winds, as well as in faster moving winds. Yet another advantage is that the airfoil kite, described herein, is faster than all other quad line kites.

In summary, and in accordance with the above discussion, the foregoing objectives are achieved in the following embodiments.

1. A framed airfoil kite, comprising, a flexible airfoil-shaped envelope, having a leading edge, a trailing edge, and two side edges; said leading edge having an air intake opening extending therealong for inflating the airfoil-shaped envelope when said leading edge is presented to a flowing air stream; a flexible resilient front spar extending along the entire leading edge of said airfoil-shaped envelope; a flexible resilient rear spar extending along the entire trailing edge of said airfoil-shaped envelope; two flexible resilient side spars extending along the respective side edges of said envelope; two upper control lines connected to said front spar at points near its opposite ends; and two lower control lines connected to said rear spar at points near its opposite ends; each side spar being formed to include a relatively inflexible frontal portion and a relatively flexible rear end portion; the rear end portions of the side spars being connected to the ends of the rear spar so that a pulling action on either lower control line produces flexure of the associated end portions of the rear spar and associated side spar.

2. The framed airfoil kite, as described in paragraph 1, and further comprising, two manually-operable control handles, connected to said control lines, so that one control handle is attached to one upper control line and one lower control line, and the other control handle is attached to the other upper control line and the other lower control line.

3. The framed airfoil kite, a described in paragraph 2, wherein each control handle includes an upper C-shaped section, adapted to partially encircle the person's first finger, and a palm-engageable section, adapted to be encircled by the person's last three fingers.

4. The framed airfoil kite, as described in paragraph 3, wherein each control handle has an upper end connectable to a control line and a lower end connectable to a control line; said upper handle end constituting the termination of said C-shaped section; said lower handle end being spaced from said palm-engageable section of said control handle.

5. The framed airfoil kite, as described in paragraph 1, wherein each of said front and rear spars has a central section that is relatively inflexible, and two end sections that are relatively flexible, whereby principal flexure of the front and rear spars occurs at the spar ends.

6. The framed airfoil kite, as described in paragraph 5, and further comprising, a transversely slidable connection between each upper control line and the associated end of the front spar; each slidable connection comprising a roller encircling the spar for limited sliding motions therealong.

7. The framed airfoil kite, as described in paragraph 5, and further comprising, a transversely slidable roller connection means between each lower control line and the associated end of the rear spar; each said roller connection means comprising two rollers encircling the associated rear spar for limited sliding motion therealong.

8. The framed airfoil kite, as described in paragraph 7, wherein each roller connection means comprises, a bridle assembly, having end connections to said two rollers, and an intermediate point of attachment to the associated control line.

9. The framed airfoil kite, as described in paragraph 1, wherein each of said front and rear spars, has a central section that is relatively rigid, and two end sections that are relatively flexible, whereby, principal flexure of the front and rear spars occurs at the spar ends; the center sections of the rear spar having greater flexibility than the end sections of the front spar.

10. The framed airfoil kite, as described in paragraph 1, wherein each side spar further comprises, a one piece spar that is tapered in the front-to-rear direction; the taper being such that principal flexure occurs in the rear one-third of said spar.

11. The framed airfoil kite, as described in paragraph 10, and further comprising, a physical attachment means between the rear end of each side spar and an end portion of the rear spar; said physical attachment means comprising a roller encircling the rear spar, and a fabric tab extending from the associated side spar partially around said roller, to form an articulated connection between said rear spar and said associated side spar.

12. The framed airfoil kite, as described in paragraph 10, and further comprising, a physical attachment means between the front end of each side spar and an end portion of the front spar; said physical attachment means comprising a roller encircling the rear spar, and a fabric tab extending from the associated side spar partially around said roller, to form an articulated connection between said front spar and said associated side spar.

BRIEF DESCRIPTION OF THE DRAWINGS

FIGS. 17 and 18, are fragmentary sectional views, taken through a sleeve structure and the front spar, used in the FIG. 1 kite. FIG. 17, is taken with the sleeve and spar in an unstressed condition. FIG. 18, is taken with the sleeve and spar in a stressed condition, due to a pull force exerted on the associated control line.

DESCRIPTION OF THE PREFERRED EMBODIMENTS OF THE PRESENT INVENTION

Prior to describing and showing in great detail the framed airfoil kite structure, it is useful to first describe, in comprehensive detail, different attitudes, or conditions, associated with specific flight maneuvers, of the framed airfoil kite of the present invention.

Figure 19:
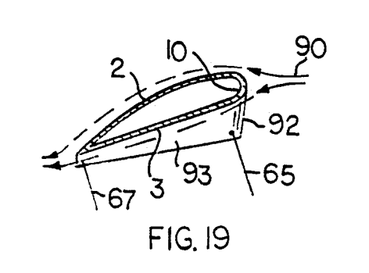
FIG. 19, is a sectional view, taken along line 19—19, as seen in FIG. 20.
Figure 20:
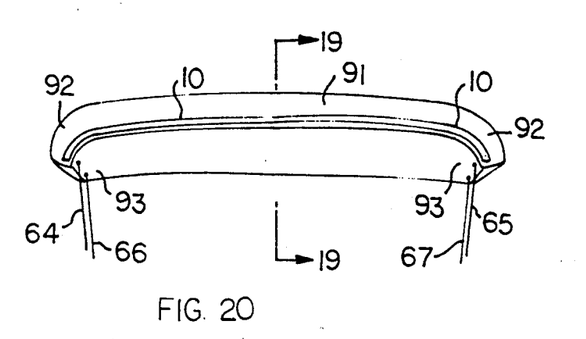
FIG. 20, is a schematic edge view, of the FIG. 1 kite during flight.

FIG. 19, is a sectional view, taken along line 19—19, as seen in FIG. 20.

Figure 1:
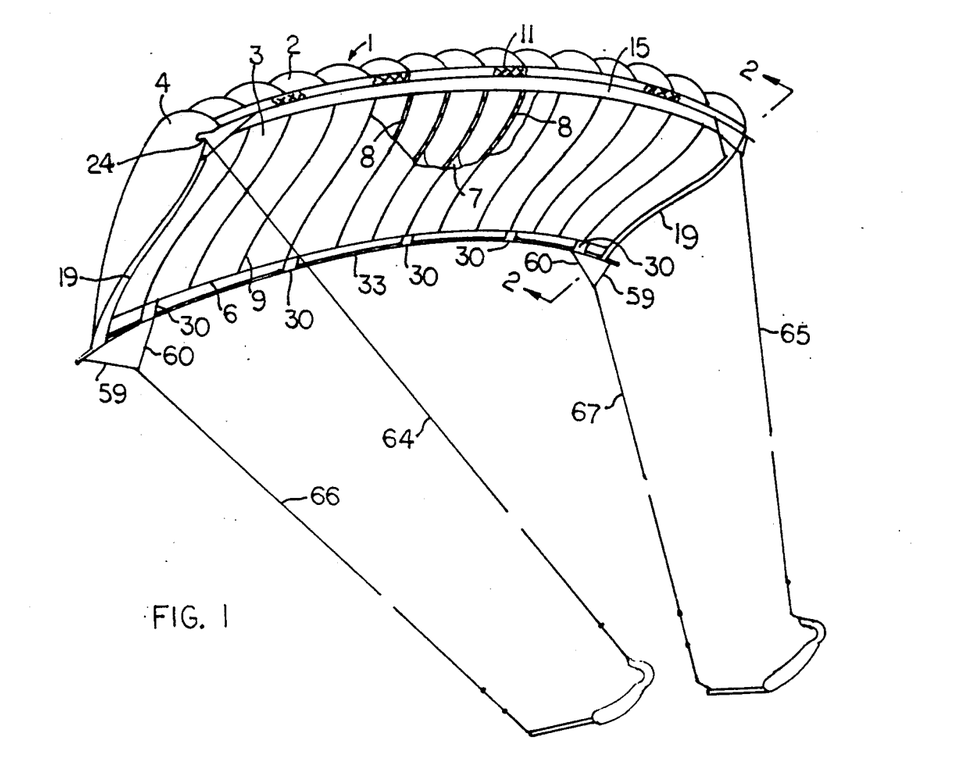
FIG. 1, is a perspective view, partially cut away, of an inflatable airfoil kite structure, embodying features of the present invention.

FIG. 20, is a schematic edge view, of the FIG. 1 kite during flight.

Figure 21:
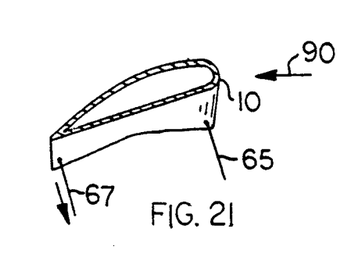
FIGS. 21 and 22, are views taken in the same direction as FIG. 19, but showing the kite in different flight conditions.
Figure 22:
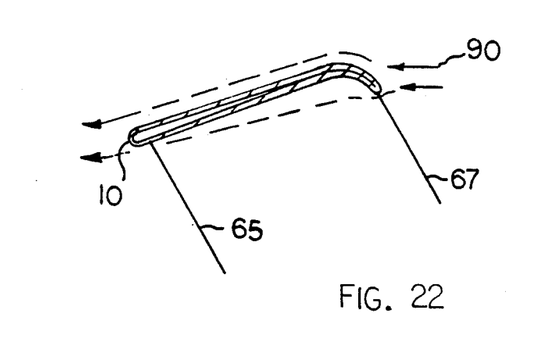

FIGS. 21 and 22, are views taken in the same direction as FIG. 19, but showing the kite in different flight conditions.

FIGS. 19 through 22, schematically illustrate the FIG. 1 kite in different attitudes, or conditions, associated with specific flight maneuvers. FIGS. 19 and 20, show the airfoil kite in so-called normal flight, under the control of four control lines, 64, 65, 66, and 67, that are attached to control handles (not shown here), which are held by the person flying the kite. Control lines 64 and 66, are attached to a control handle held in the person's left hand. Control lines 65 and 67, are attached to a second control handle held in the person's right hand. With this arrangement, the person can exert a desired, specific pulling force on any one of the control lines.

When the kite is in flight, ram air enters into the envelope, through the elongated opening 10, located in the leading edge of the kite, to inflate the kite into an airfoil envelope configuration, as viewed in FIG. 19. The atmosphere wind, moving in the arrows 90 directions, produces a lift action on the kite, due to the unequal air flow rates on the top and bottom surfaces, 2 and 3, respectively. Also, the wind pressure on surface 3, causes the central portion 91, of the kite, to be displaced upwardly, relative to the kite end portions 92, which are restrained by the control lines 64, 65, 66, and 67. End portions 92, of the kite, curl downwardly, relative to central portions 91, to form facing lateral control surfaces 93, that are believed to act somewhat like rudders, or keels, to prevent uncontrolled sideways motion of the kite. The wind moving along the kite bottom surface 3, exerts equal drag forces on control surfaces 93, whereby, the kite is stabilized against sideways displacement, in either direction.

In order to cause the kite to turn, a pulling force may be applied to one of the lower control lines, i.e., 66 or 67. FIG. 21, shows the effect of an increased pull force on line 67. The effective area of the control surface 93, associated with line 67, is increased, such that a greater aerodynamic drag force is applied to that control surface, as compared to the drag force applied to the other control surface. The unequal drag forces cause the kite to turn, or bank, in a direction that will equalize the forces. If the pull force is applied to the rightmost control line, the kite will turn to the right; if the pull force is applied to the leftmost control line, the kite will turn to the left.

A so-called 'pinwheel turn', can be achieved by simultaneously applying a pulling force on one of the upper control lines, i.e., 64 or 65, and an opposite one of the lower control lines, i.e., 66 or 67. For example, if pulling forces are simultaneously applied to control lines 64 and 67, the kite will tend to rotate around an imaginary central axis line, extending parallel to lines 64 and 67, and midway between those two control lines. The pulling force on control line 64, causes the associated control surface 93, to be enlarged near the leading edge of the kite, so as to increase the drag force at that area of the kite. The pulling force on control line 67, causes the associated control surface 93, to be enlarged, near the trailing edge of the kite, so as to increase the drag force at that particular area of the kite. The two drag forces cooperate to produce the so-called 'pinwheel' motion, i.e., around an imaginary central axis, extending midway between control lines 64 and 67.

A 'pinwheel' motion of the kite in the opposite direction, can be readily achieved by simultaneously applying pulling forces to control lines, i.e., 65 and 66.

The kite can be made to perform reverse flight, by simultaneously applying pulling forces to both lower control lines 66 and 67. The kite can be made to dive, by simultaneously applying pulling forces to both upper control lines 64 and 65.

The kite can be brought to a stop, by exerting an increased pulling force on both control lines 66 and 67, i.e., by forcing the kite to climb to a stalled condition, wherein, the air on the top surface 2, is in a turbulent condition, that no longer produces a lift action on the kite.

FIG. 22, shows the kite in the so-called reverse flight position, wherein, the trailing edge of the kite becomes the leading edge. Air within the kite envelope is exhausted through the elongated opening 10, such that the kite is in a deflated condition. The reverse flight position, is achieved by exerting relatively strong pulling forces on lower control lines 66 and 67, while at the same time relaxing the manual pressure on upper control lines 64 and 65. The upper control lines have reduced tension, while the lower control lines are in greater tension, to pull the trailing edge of the kite forward. The normal flight condition of FIG. 19, can be restored by increasing the manual pulling forces on lines 64 and 65, while relaxing the pulling pressure on lines 66 and 67; such action enables the ram air to re-inflate the kite through elongated opening 10.

The detailed structure of the kite is shown in greater detail in FIGS. 1 through 10.

FIG. 1, is a perspective view, partially cut away, of an inflatable airfoil kite structure, embodying features of the present invention.

Figure 2:
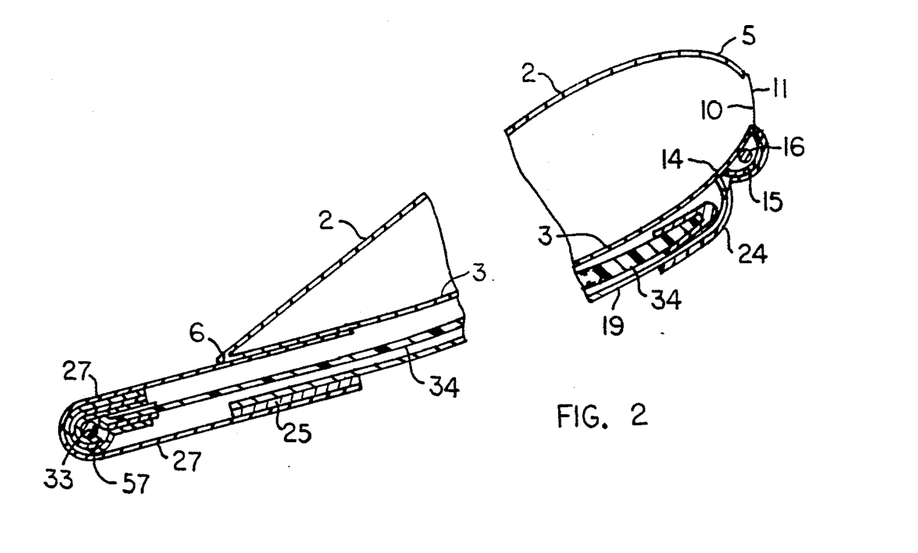
FIG. 2, is a transverse sectional view, taken essentially along line 2—2, as seen in FIG. 1.

FIG. 2, is a transverse sectional view, taken essentially along line 2—2, as seen in FIG. 1.

Figure 3:
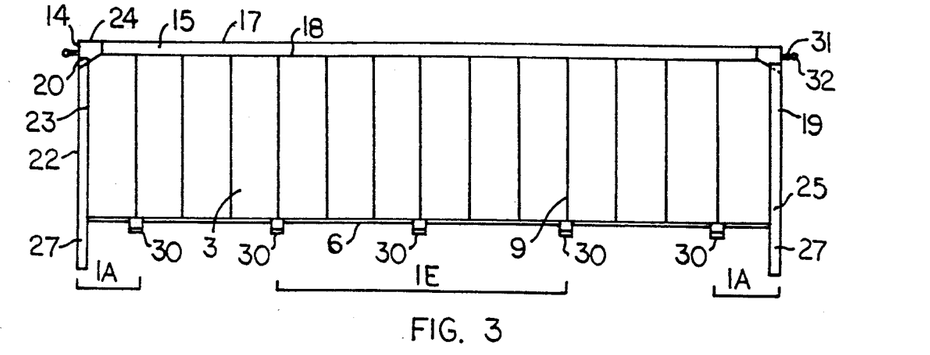
FIG. 3, is a plan view, of the fabric component used in the FIG. 1 kite, taken with certain spars removed.

FIG. 3, is a plan view, of the fabric component used in the FIG. 1 kite, taken with certain spars removed.

As seen in FIG. 1, the kite comprises, a flexible non-stretchable fabric sail, or envelope, structure 1, that includes a top skin, or surface 2, and a bottom skin, or surface, 3, said skins being joined together, to form a leading edge 5, and a trailing edge 6. The ends of the two skins, i.e., 2 and 3, are closed by fabric end walls 4, which are airfoil-shaped.

At spaced points along the transverse lengths of skins 2 and 3, said skins are interconnected, by means of fabric partitions 8, whereby the airfoil-shaped envelope 1, is subdivided into a series of hollow compartments 7, as seen through the partial cut-away. In FIGS. 1 and 3, the stitched connections between partitions 8, and bottom skin 3, are referenced by numeral 9. Each fabric partition 8, has an airfoil shape, which causes the defined envelope to have an airfoil shape, when ram air is introduced into the envelope 1, through the elongated slot-like opening 10, in the leading edge 5, of the envelope. A strip of gauze, or net material 11, extends along and across opening 10, to prevent passage of debris, carried by the air, into the airfoil-shaped envelope.

Figures 9, 10:
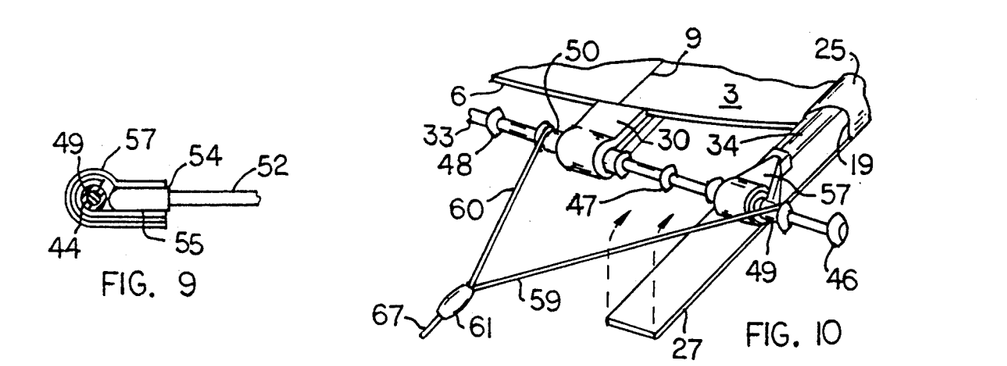
FIG. 9, is a fragmentary view of the structural detail, used in the FIG. 7 spar.
FIG. 10, is an enlarged perspective view of a connection mechanism, used to attach a side spar to a rear spar to the envelope (sail), in the FIG. 1 kite.

The upper edge area of fabric wall 3, is turned forward and then downward, as at 15, after which the turned edge portion is sewn to wall 3, as at 14, to form an elongated pocket, or sleeve, extending the full transverse length of wall 3. For convenience purposes, the sleeve is referenced by numeral 15. End areas of sleeve 15, may be reinforced by triangular fabric panels 24. Each fabric panel 24, overlaps the associated sleeve 15, and also the end portion of another fabric pocket, or sleeve 19, extending along the associated side edge of skin 3. Triangular sleeve 24, thus reinforces, and interconnects, end areas of sleeves 15 and 19. Another method of interconnecting side spar 34, to front spar 16, is by means of VELCRO tabs, as shown in FIG. 9.

There are two sleeves 19, i.e., one sleeve 19, extending along each side edge of the fabric wall 3. Each sleeve 19, can be formed by turning a side edge area of wall 3 forward, and then back onto the exposed surface of wall 3. The extreme end edge of the sleeve material is then sewn to wall 3, to define the sleeve 19. The upper, or forward, end of each sleeve 19, is closed by the aforementioned fabric panel 24. The lower, or rear, end of each sleeve 19, is left open, ion order to permit an elongated side spar 52, (FIG. 8), to be inserted into the respective sleeve 19.

The aforementioned pocket 15, accommodates an elongated front spar 16, that is preferably formed of a flexible resilient material, such as fiberglass, graphite composite material, an aluminum alloy, or the like. Front spar 16, extends completely through and along pocket 15, such that end areas of the spar 16, are exposed for attachment to control lines 64 and 65.

At its trailing edge 6, the fabric envelope 1, is equipped with a plural number of fabric loops 30, adapted to encircle, and support, elongated rear spar 33.

As seen in FIGS. 1 and 3, there are preferably five loops 30, along the length of trailing edge 6, although a different number of loops may be utilized in differing embodiments. Each loop 30, can be formed conveniently, by a fabric strip sewn to a face area of the fabric envelope, and doubled back upon itself, to form a loop structure 30. Face areas of the strip, have fibrous adhesive hook and loop materials, secured thereon. Suitable hook and loop materials, are available under the tradename VELCRO. When the fabric strip is doubled back on itself, the hook and loop fibers interlock, to maintain the strip in a looped configuration. Each loop 30 can be readily opened, in order to facilitate insertion and removal, of the rear spar 33.

Figure 4:
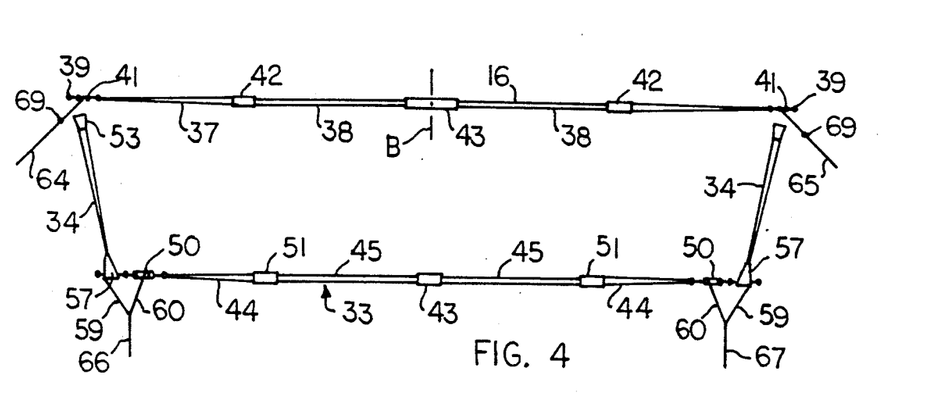
FIG. 4, is a plan view, of a skeletal framework structure, that can be assembled to the FIG. 3 fabric component, to form the FIG. 1 kite structure.

FIG. 4, is a plan view, of a skeletal framework structure, that can be assembled to the FIG. 3 fabric component, to form the FIG. 1 kite.

FIG. 4, shows a skeletal framework, used to frame the edge areas of fabric envelope 1. The framework is formed by the spars, i.e., front spar 16, side spars 34, and rear spar 33, said framework being shown detached from the associated fabric envelope 1, for better illustrating the framework structure.

Figure 5:
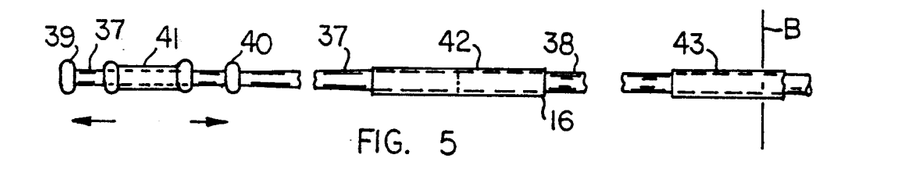
FIG. 5, is an enlarged fragmentary view of a front spar, used in the FIG. 4 framework.

FIG. 5, is an enlarged fragmentary view of a front spar, used in the FIG. 4 framework.

FIG. 5, is a fragmentary enlarged view of the front spar 16, showing only approximately one-half of the spar length. Spar 16, is symmetrical around a midplane B, that bisects an elongated tubular ferrule 43, that is used to connect the spar 16 half sections together.

Each spar 16 half section, comprises a non-tapered tubular spar element 38, extending into ferrule 43. A second tapered spar element 37, is joined to each spar element 38, by means of a ferrule 42. Each spar element 38, is substantially rigid, whereas each spar element 37, is flexible and resilient, with its flexibility increasing gradually from ferrule 42, to the outer end of element 37.

A roller 41, is slidably and rotatably supported on spar element 37, between an inner bead 40, and an outer bead 39. Each roller 41, can rotate freely on spar element 37, and also move linearly along the spar element 37, between the two beads 39 and 40, as indicated by the arrows in FIG. 5. As seen in FIG. 4, each roller 41, serves as an anchorage for one of the upper control lines, i.e., 64 or 65.

Figure 17:
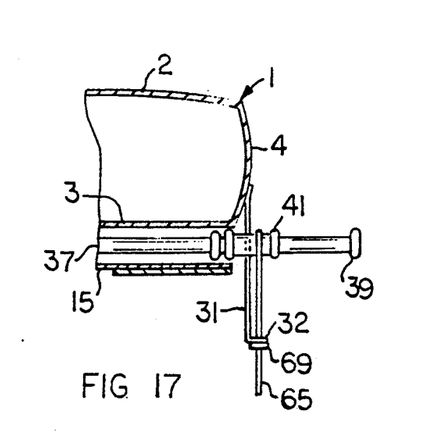
Figure 18:
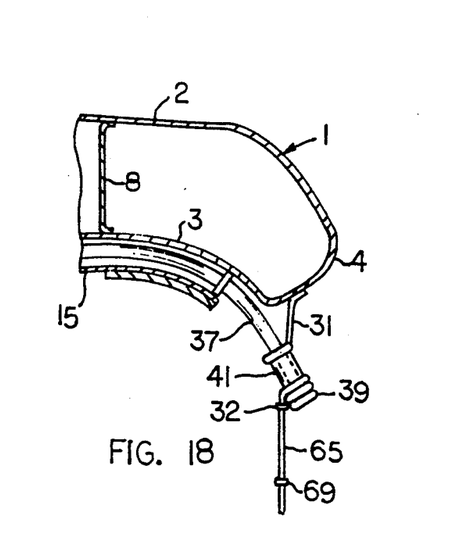

FIGS. 17 and 18, are fragmentary sectional views, taken through a sleeve structure and the front spar, used in the FIG. 1 kite. FIG. 17, is taken with the sleeve and spar in an unstressed condition. FIG. 18, is taken with the sleeve and spar in a stressed condition, due to a pull force exerted on the associated control line.

FIGS. 17 and 18, show details, believed to be the operational configuration, of the connections between a control line 65, and the fabric envelope 1. A similar connection is also provided for line 64. A ring 32, is attached to an elongated fabric strap 31, that extends from the airfoil envelope 1. Ring 32, encircles line 65, so that it can move along the line between a bead 69, and the anchored end of the line 65, on roller 41.

When a pulling force is exerted on control line 65, roller 41, can slide outwardly toward bead 39, so as to produce a relatively great bending action on the resilient portion 37, of front spar 16. Bearings 41, located at opposite ends of spar 16, allow the fabric envelope to more easily slide in towards midplane B (FIG. 4) of spar 16, when the envelope is inflated to its normal flight condition, as represented generally by FIGS. 18, 19, and 20. Rotational motion of each roller bearing 41, around the spar 16, allows the spar 16, to bend without torsional constraint due to the anchorage of lines 64 and 65.

Figure 6:
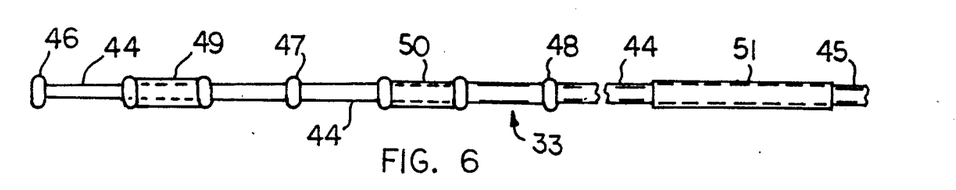
FIG. 6, is an enlarged fragmentary view of a rear spar, used in the FIG. 4 framework.

FIG. 6, is an enlarged fragmentary view of a rear spar, used in the FIG. 4 framework.

The construction of the rear spar 33, is best shown in FIGS. 4 and 6. FIG. 6, shows approximately one-quarter of the total spar 33 length. Two semi-rigid non-tapered spar elements 45, are joined together by a center ferrule 43. Each spar element 45, has its outboard end extending into a second ferrule 51, for connection to a flexible resilient tapered spar element 44. Beads 46, 47, and 48, are spaced along each spar element 44, to serve as stops for limiting the linear motion of the rollers, i.e., bearings, 49 and 50, along the spar element 44. Each bearing, 49 or 50, can rotate freely on the associated spar element 44.

The rear spar 33, is slightly shorter, and somewhat more resilient than, the front spar 16. Therefore, spar 33, will achieve greater deflection, i.e., curvature, in response to pulling forces exerted on the spar 16, by control lines 66 and 67, whether by the wind force, or by manual force, on the associated control handle.

Figure 7:
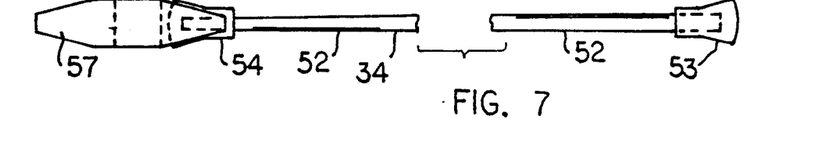
FIG. 7, is a fragmentary view of a side spar, used in the framework of FIG. 4.

FIG. 7, is a fragmentary view of a side spar, used in the framework of FIG. 4.

Figure 8:
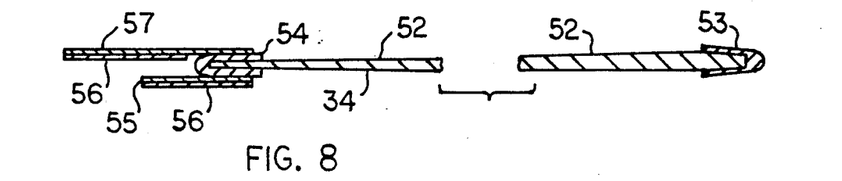
FIG. 8, is a longitudinal sectional view, taken along line 8—8, as seen in FIG. 7.

FIG. 8, is a longitudinal sectional view, taken along line 8—8, as seen in FIG. 7.

FIG. 9, is a fragmentary view of the structural detail, used in the FIG. 7 spar.

FIGS. 7 and 8, illustrate the general construction of each side spar 34. The spar 34, comprises an elongated cylindrical rod-like structure 52, formed of stiff, yet resilient material, such as fiberglass, composite graphite material, an aluminum alloy, or the like. The rod-like structure is slightly tapered in a right to left direction, as shown in FIGS. 7 and 8. A hollow tip 53, is glued to the large diameter end of the spar 34. A slightly smaller tip 54, is glued to the smaller end of the spar 34. Tip 54, has two tabs, 55 and 57, glued thereto, for extension longitudinally of the spar 34. Adhesive hook and loop fibrous patches 56, are secured to tabs 55 and 57, such that tab 57, can be extended around a roller 49, and then adhesively attached to tab 55, as shown generally in FIG. 9. The side spar 34, is thus effectively tied to rear spar 33, in an articulated fashion. Each spar can, therefore, flex without undue restraint by the other spar.

FIG. 10, is an enlarged perspective view of a connection mechanism, used to attach a side spar to a rear spar to the envelope (sail), in the FIG. 1 kite.

During the assembling process, each side spar 34, is first inserted into its fabric pocket 19, after which rear spar 33, is attached to the side spars 34, and to the trailing edge 6, of the fabric envelope. The various loops 30, are extended around spar 33, and each tab 57, is extended around the associated roller 49, as shown in FIG. 10. Additionally, an elongated fabric strap 27, is extended from the fabric pocket 19, around spar 33, and onto the exposed face of a fibrous adhesive patch 25, carried on pocket 19. The facing surfaces of patch 25, and strap 27, are formed of adhesive hook and loop materials, e.g., the materials sold under the tradename VELCRO.

Each set of rollers 49 and 50, form anchorages for a bridle assembly, that includes an outside bridle line 59, and an inside bridle line 60. The two bridle lines, i.e., 59 and 60, are attached to the associated control line, 66 or 67, via a connector 61. Rollers 49 and 50, can rotate, and also slide linearly, along rear spar 33, such that the trailing edge of the fabric envelope, can shift in transverse directions, without constraint by the bridle lines 59 and 60, or spar 33. The bridle assembly, greatly improves control action of lines 66 and 67, during reverse flight operations, as well as providing a mechanism for compensating for variations in the lengths of the control lines. In a preferred form of the invention, the lower control lines 66 and 67, are slightly closer together than the upper control lines 64 and 65, at their pints of connection to the respective spars, 33 and 16. Bridle lines 59 and 60, distribute the control line loadings to spar 33, thereby lessening the unit area loadings on the spar 33.

Side spars 34, are tapered and proportioned, so that only about one-third of the spar length undergoes a deflection in response to a pulling force on control line 66 or 67, whereas, the upper two-thirds of each side spar 34, remains in a rigid, undeformed state. Similarly, rear spar 33, is essentially rigid in the central zone formed between ferrules 51, as shown in FIG. 4. Only the outermost spar elements 44, experience any appreciable deformation in response to pulling forces on control lines 66 and 67, i.e., manually or by wind forces. When the pulling force on lines 66 and 67, is reduced or removed, the side spars 34, and rear spar 33, resiliently return to their undeformed states. The side spars 34, and rear spar 33, act cooperatively to increase the drag surface areas at the rear ends of the curled kite end portions 92, as shown in FIG. 20, when pulling forces are applied to the spars, via control lines 66 and 67. When the pulling forces are removed from control lines 66 and 67, the spars rapidly snap back to their original configuration.

Figures 11, 12, 13, 16:
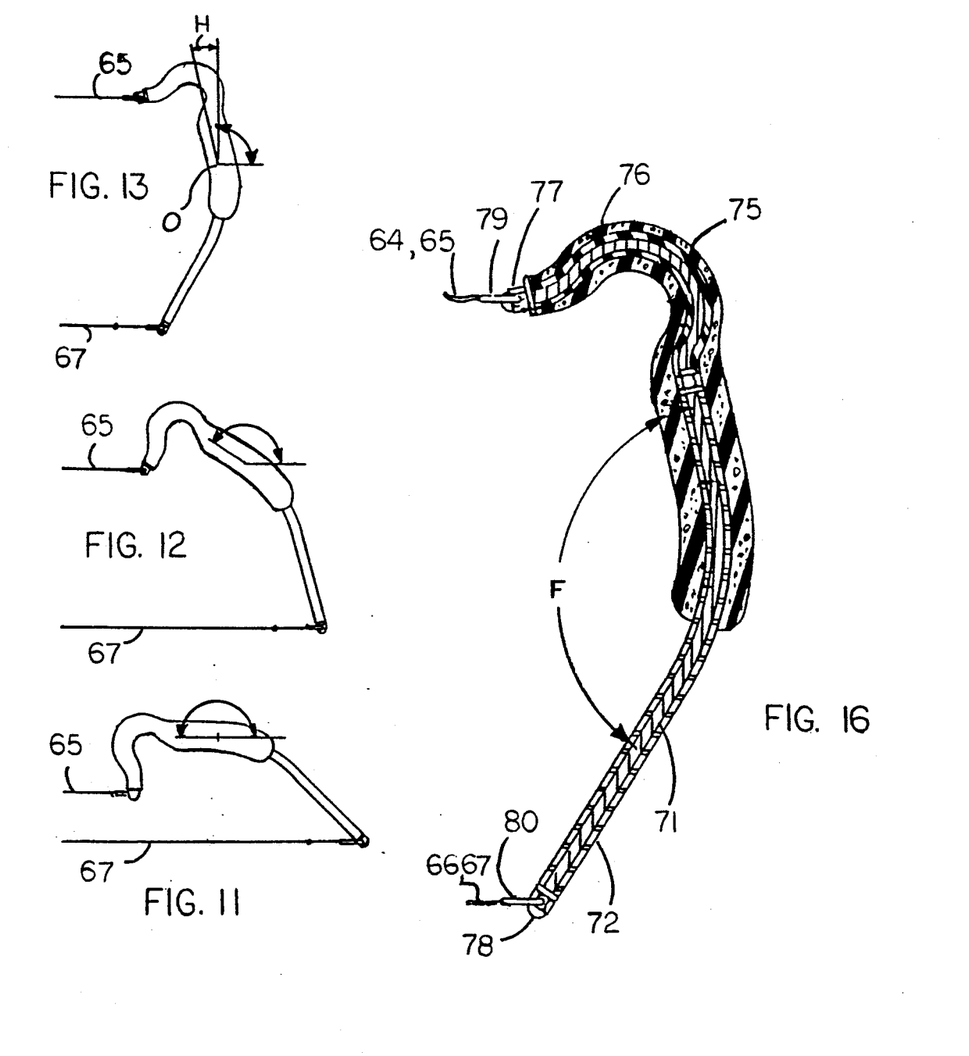
FIGS. 11 through 15, are side elevation views, of a control handle, used with the FIG. 1 kite. The control handle is shown in different adjusted positions, for directing the kite through various different flight maneuvers.
FIG. 16, is an enlarged sectional view, taken through the control handle, shown in FIGS. 11 through 15.
Figure 14:
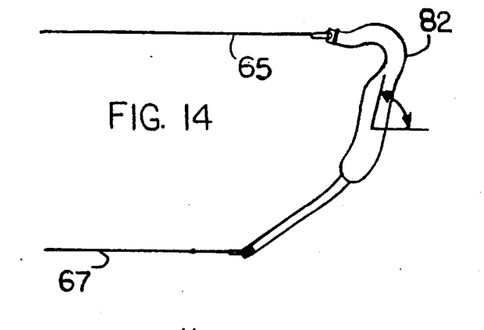

FIG. 16, is an enlarged sectional view, taken through the control handle, shown in FIGS. 11 through 15.

As previously noted, each set of control lines 64, 66, or 65, 67, is attached to a control handle adapted to be held in the hand of the person flying the kite. FIG. 16, shows certain features of a suitable handle construction that can be used. The illustrated control handle includes a solid steel shaft, or rod 71, that has its lower portion encased in a stainless steel tube 72. The upper portion of shaft 71, is covered by a vinyl tube 73. An annular foam rubber grip 82, (FIG. 14), encircles the upper portion of the encased shaft 71.

At its opposite ends, the control handle is provided with triangular clips 79 and 80, for connection with the upper and lower control lines, respectively. Each triangular clip, 79 and 80, is pivotably mounted on a cap nut 77 or 78, which is threaded onto the associated end of shaft 71.

The control handle includes an upper C-shaped section 75, adapted to partially encircle the person's first finger. The person's thumb can press against the upper convex surface area 76, while the last three fingers can encircle the palm-engaged hand grip area, designated by arrows F, as shown in FIG. 16. The illustrated control handle configuration, has been found to provide satisfactory leverage for exerting the necessary control forces on the various control lines, within the limitations imposed by the average human hand. The control handle is designed such that it is not apt to be deflected or dislodged from a selected position, even under heavy wind conditions.

The control handle is also designed so that the person's first finger can exert an upward actuation force on handle portion 75, while the palm area is exerting a forward rocking force on handle area F. Area F, is spaced away from the lower line attachment clip 80, whereby, the palm area can achieve a satisfactory motion of the lower line. In another control action the control handle can be drawn rightward, in a direction generally parallel to the various control lines. In still another type of control action, the control handle can be rocked in a counter-clockwise direction, by exerting thumb pressure on handle area F. The various control handle actions indicated, produce different flight maneuvers of the kite.

FIGS. 11 through 15, are side elevation views, of a control handle, used with the FIG. 1 kite. The control handle is shown in different adjusted positions, for directing the kite through various different flight maneuvers.

Figure 15:
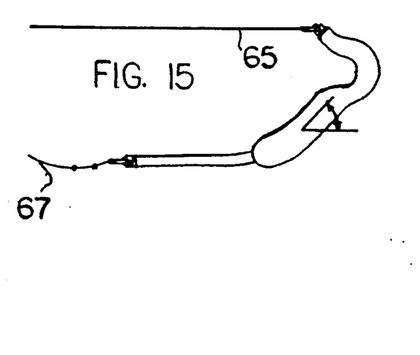

Some flight maneuvers can be achieved using only the two upper control lines, i.e., 64 and 65. FIG. 15, shows the normal flight position, using only the two upper control lines, 64 and 65. The two lower control lines, i.e., 66 and 67, are generally in slackened conditions, as indicated generally in FIG. 15. The flight position is maintained by a combination of forces, including aerodynamic lift action, resulting from unequal air flow rates across the kite top and bottom surfaces 2 and 3, the tension applied to lines 65 and 67, by the manual handles, the weight of the kite structure, and the upward bowing of the kite central portion by the wind, as depicted generally in FIG. 20.

FIGS. 11 through 14, show different positions of the control handle when all four of the control lines are in use. FIG. 13, represents the normal flight position, in which either control handle can be rocked around an imaginary point O, to adjust the attitude of the kite. Angle H, represents the normal angle of adjustment needed to maintain the kite in position.

FIG. 12, represents the control handle position required to achieve a kite turning motion. One control handle is manipulated into the FIG. 12 position, while the other control handle is held in approximately the FIG. 13 position. The increased manual tension applied to line 67, as shown in FIG. 12, causes the associated rear side edge area of the kite to produce an increased localized drag force, thereby achieving a turning motion of the kite.

FIG. 21, illustrates generally the effect on the kite of the control actions depicted in FIGS. 12 and 13, i.e., one control handle in the FIG. 12 position, and one control handle in FIG. 13 position. A 'pinwheel' turning motion can be achieved by holding one control handle in the FIG. 12 position, and the other control handle in the FIG. 14 position. When a control handle is manipulated to the FIG. 14 position, there is an increased pulling force exerted on the upper line, i.e., 65, or 64, and a decreased force exerted on the associated lower line, i.e., 67, or 66. The associated frontal portion of the kite curled side edge 92, as shown in FIG. 20, is deflected downward into the wind, in order to exert an increased drag force. By coupling the two control handles together in the positions of FIGS. 12 and 14, the drag forces generated at diagonally spaced areas of the kite, cause the kite to undergo a 'pinwheel' turning motion, around a central axis, extending generally parallel to the four control lines. The direction of the 'pinwheel motion' is determined by the relative dispositions of the control handles, i.e., which control handle is in the FIG. 12 position, and which control handle is in the FIG. 14 position.

FIG. 11, depicts the control handle attitude required to produce reverse flight of the kite, as depicted generally in FIG. 22. With each control handle held in the FIG. 11 position, the lower control lines exert pulling forces on the trailing end of the kite, thereby producing a reverse flight condition.

The flight maneuvers, attitudes, etc., of the present invention are determined primarily through the spar arrangement, whereby, the inflatable kite can be controlled and maneuvered by selective deflection of different spar sections. FIG. 3, shows generally the zones of the airfoil envelope where the principal envelope deflections occur, as a result of the localized spar deformations. Central zone 1E, of the envelope, experiences little, if any, deflection, or bowing, even in relatively heavy winds. End zones 1A, experience the principal deflection. The zones between end areas 1A and central zones 1E, may experience some deflection under particular conditions, e.g., heavy winds, or strong manual pull forces, on the associated control lines. The envelope deflection can occur near the leading edge of the airfoil envelope, or near the trailing edge of the envelope, depending on the control handle orientation and hand action. Kites constructed as shown in the drawings herein, have been found to have a quick response to the control signals transmitted to the kite, through the various control lines. The kite of the present invention, is able to transition very rapidly from one type of flight maneuver to another flight maneuver, without hesitating.

The present invention relates to a framed airfoil kite. Features of the present invention are recited in the appended claims. The drawings contained herein necessarily depict specific embodiments of the apparatus, useful in practice of the present invention. However, it will also be appreciated by those skilled in the arts pertaining thereto, that the present invention can be practiced in various forms and configurations. Further, the previous detailed descriptions of the preferred embodiments of the present invention, are presented for the purposes of clarity of understanding only, and no unnecessary limitations, should be understood or implied therefrom. Finally, all appropriate mechanical and functional equivalents to the above, which may also be obvious to those skilled in the arts pertaining thereto, are considered to be encompassed within the claims of the present invention.

What is claimed is:

1. A framed airfoil kite, comprising, a flexible airfoil-shaped envelope having a leading edge, a trailing edge, and two side edges; said leading edge having an air intake opening extending therealong, for inflating the airfoil-shaped envelope when said leading edge is presented to a flowing air stream; a flexible resilient front spar extending along the entire leading edge of said envelope; a flexible resilient rear spar extending along the entire trailing edge of said envelope; two flexible resilient side spars extending along the respective side edges of said envelope; two upper control lines connected to said front spar at points near its opposite ends; and two lower control lines connected to said rear spar at points near its opposite ends; each side spar being formed to include a relatively inflexible frontal portion and a relatively flexible rear end portion; the rear end portions of the side spars being connected to the ends of the rear spar so that a pulling action on either lower control line produces flexure of the associated end portions of the rear spar and associated side spar.

2. The framed airfoil kite, as described in claim 1, and further comprising, two manually-operable control handles, connected to said control lines, so that one control handle is attached to one upper control line and one lower control line, and the other control handle is attached to the other upper control line and the other lower control line.

3. The framed airfoil kite, as described in claim 2, wherein each control handle includes an upper C-shaped section, adapted to partially encircle the person's first finger, and a palm-engageable section, adapted to be encircled by the person's last three fingers.

4. The framed airfoil kite, as described in claim 3, wherein each control handle has an upper end connectable to a control line, and a lower end connectable to a control line; said upper handle end, constituting the termination of said C-shaped section; said lower handle end, being spaced from the palm-engageable section of the handle.

5. The framed airfoil kite, as described in claim 1, wherein each of said front and rear spars has a central section, that is relatively inflexible, and two end sections, that are relatively flexible, whereby principal flexure of the front and rear spars occurs at the spar ends.

6. The framed airfoil kite, as described in claim 5, and further comprising, a transversely slidable connection between each upper control line and the associated end of the front spar; each slidable connection further comprising, a roller encircling the spar for limited sliding motions therealong.

7. The framed airfoil kite, as described in claim 5, and further comprising, a transversely slidable roller connection means between each lower control line and the associated end of the rear spar; each said roller connection means comprising, two rollers encircling the associated rear spar for limited sliding motion therealong.

8. The framed airfoil kite, as described in claim 7, wherein each roller connection means comprises, a bridle assembly, having end connections to said two rollers, and an intermediate point of attachment to the associated control line.

9. The framed airfoil kite, as described in claim 1, wherein each of said front and rear spars, has a central section that is relatively rigid, and two end sections that are relatively flexible, whereby principal flexure of the front and rear spars occurs at the spar ends; the center sections of the rear spar having greater flexibility than the end sections of the front spar.

10. The framed airfoil kite, as described in claim 1, wherein each side spar further comprises, a one piece spar that is tapered in the front-to-rear direction; the tape being such that principal flexure occurs in the rear one-third of said spar.

11. The framed airfoil kite, as described in claim 10, and further comprising, a physical attachment means between the rear end of each side spar and an end portion of the rear spar; said physical attachment means comprising a roller encircling the rear spar, and a fabric tab extending from the associated side spar partially around said roller to form an articulated connection between the rear spar and the associated side spar.

12. The framed airfoil kite, as described in claim 10, and further comprising, a physical attachment means between the front end of each side spar and an end portion of the front spar; said physical attachment means comprising a roller encircling the rear spar, and a fabric tab extending from the associated side spar partially around said roller, to form an articulated connection between said front spar and said associated side spar.

* * * * *